United States Patent
Jang (10) Patent No.: US 8,593,669 B2
(45) Date of Patent: Nov. 26, 2013

(54) IMAGE FORMING APPARATUS, E-MAIL SERVER, E-MAIL FACSIMILE TRANSMISSION SYSTEM HAVING THE SAME, AND E-MAIL FACSIMILE SETTING METHOD OF IMAGE FORMING APPARATUS

(75) Inventor: Woo-yeon Jang, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 617 days.

(21) Appl. No.: 12/546,759

(22) Filed: Aug. 25, 2009

(65) Prior Publication Data

US 2010/0067063 A1    Mar. 18, 2010

(30) Foreign Application Priority Data

Sep. 17, 2008   (KR) .................. 10-2008-0091123

(51) Int. Cl.
*H04N 1/00* (2006.01)
*G06F 3/12* (2006.01)
*G06K 15/00* (2006.01)

(52) U.S. Cl.
USPC .......... 358/1.15; 358/404; 358/407; 358/408; 358/1.13; 358/1.14; 358/1.16

(58) Field of Classification Search
None
See application file for complete search history.

(56) References Cited

U.S. PATENT DOCUMENTS

| 6,487,278 B1 | 11/2002 | Skladman et al. |
| 6,574,670 B1 | 6/2003 | Eguchi |
| 7,019,858 B1 | 3/2006 | Gopalasamy |
| 7,697,171 B2 | 4/2010 | Tonegawa |
| 2001/0033391 A1 | 10/2001 | Kihara |

(Continued)

FOREIGN PATENT DOCUMENTS

| JP | 11074986 | * 3/1999 |
| JP | 2003-233558 | 8/2003 |
| JP | 2006-85406 | 3/2006 |

OTHER PUBLICATIONS

Machine translation of JP Pub 11-074986 to Sumio Hiroshi.*
European Search Report issued Nov. 5, 2009 in EP Application No. 09169416.6.
EP Search Report issued in 12185730.4 dated Nov. 9, 2012.
KR Office Action issued in 10-2008-0091123 dated Nov. 23, 2012.
Freed Innosoft N Borenstein First Virtual N: Multipurpose Internet Mail Extensions (MIME) Part two: Media Types; rfc2046.txt, 19961101, Nov. 1, 1996, XP015007830, ISSN: 0000-003.

*Primary Examiner* — Benny Q Tieu
*Assistant Examiner* — Haris Sabah
(74) *Attorney, Agent, or Firm* — Stanzione & Kim, LLP (57) ABSTRACT

An image forming apparatus, an e-mail server, an e-mail facsimile transmission system having the same and an e-mail facsimile setting method of an image forming apparatus. The e-mail facsimile setting method of an image forming apparatus which transmits an e-mail for facsimile transmission to a facsimile server, includes displaying a parameter setting screen applied to a plurality of facsimile servers, inputting a parameter value depending on the displayed parameter setting screen; and transmitting an e-mail with an identification type to correspond to one kind of facsimile server of the plurality of facsimile servers to the facsimile server based on the input setting value. Thus, a setting screen commonly applied to a plurality of facsimile servers is provided to a user, thereby saving time and cost needed in an e-mail facsimile setting.

15 Claims, 9 Drawing Sheets

(56) References Cited

U.S. PATENT DOCUMENTS

| | | |
|---|---|---|
| 2002/0054363 A1 | 5/2002 | Eguchi |
| 2004/0024811 A1* | 2/2004 | Kitada et al. ................ 709/203 |
| 2005/0190404 A1* | 9/2005 | Nakamura ................ 358/1.15 |
| 2005/0225809 A1* | 10/2005 | Tonegawa ................ 358/402 |
| 2006/0055965 A1* | 3/2006 | Nakamura et al. ........... 358/1.15 |
| 2006/0087682 A1 | 4/2006 | Lee |
| 2006/0107212 A1* | 5/2006 | Lovat et al. ................ 715/700 |
| 2006/0248153 A1 | 11/2006 | Litwiller et al. |
| 2006/0279795 A1* | 12/2006 | Kuwahara ................ 358/401 |
| 2007/0036141 A1 | 2/2007 | Zucker |

* cited by examiner

FIG. 3A

| Email Settings | Address Book | Authentication | Fax Forward |
| SMTP Server Setup | SMTP Client Setup | Email Alert Setup | LDAP Server Setup |

SMTP Server Setup

SMTP Server and Port: [______] [25] (1~65535)

Note: if Host Name is selected, the DND Server Address should be mentioned in TCP/IP settings page.

SMTP Requires Authentication: ☐
SMTP Server Login Name: [______]
SMTP Server Password: [______]
SMTP Server Connection Timeout: [30] (30~120)secind(s)
maximum Message Size: [41MB ▽]

Note: Lager scans will be sent as multiple e-mail messages, divided at page breaks

Setup POP3 before SMTP

SMTP requires POP Before SMTP Authentication: ☐
POP3 Server and Port: [______] [110] (1~65535)

Note: if Host Name is selected, the DND Server Address should be mentioned in TCP/IP settings page.

POP3 UserName: [______]
POP3 User Password: [______]

[Submit] [ResetForm]

FIG. 3B

| Email Settings | Address Book | Authentication | Email Alert Setup | LDAP Server Setup |
| SMTP Server Setup | SMTP Client Setup | Fax Forward | | |

SMTP Client Setup

| | |
|---|---|
| Default Original Type: | Text ▽ |
| Default Scan Color: | Mono ▽ |
| Default Attachment Type: | PDF ▽ |
| Default Scan Resolution: | 300 dpi ▽ |
| Default Scan Resolution: | ☑ 25 (1~65535) Always Prompt for file format setup before scanning? |
| Default [From:] Address: | [_________] The Default address must be a valid e-mail address. |
| Allow to edit [From:] address: | ☑ Always to edit [From:] field when Authentication is not required |
| Auto Send To Self: | ☑ Automatically add the sends [From:] address to the recipient list |
| Default Subject: | Scan from a DELL MFP |
| Enable Default Mail Text: | ☑ Enable |
| Default Body Text: | Please open the attached document. it was scanned and sent to you using a DELL MFP. For more information on DELL products and solutions, please visit http://www.dell.com. |

[Submit] [ResetForm]

IMAGE FORMING APPARATUS, E-MAIL SERVER, E-MAIL FACSIMILE TRANSMISSION SYSTEM HAVING THE SAME, AND E-MAIL FACSIMILE SETTING METHOD OF IMAGE FORMING APPARATUS

CROSS-REFERENCE TO RELATED APPLICATIONS

This application claims priority from Korean Patent Application No. 10-2008-0091123, filed on Sep. 17, 2008 in the Korean Intellectual Property Office, the disclosure of which is incorporated herein by reference.

BACKGROUND

1. Field of the General Inventive Concept

Apparatuses and methods consistent with the present general inventive concept relate to an image forming apparatus, an e-mail server, an e-mail facsimile transmission system having the same, and an e-mail facsimile setting method of an image forming apparatus. More particularly, the present general inventive concept relates to an image forming apparatus transmitting an e-mail to at least one facsimile server of a plurality of different kinds of facsimile servers. The present general inventive concept also relates to an e-mail server, an e-mail facsimile transmission system having the same, and an e-mail facsimile setting method of an image forming apparatus.

2. Description of the Related Art

An image forming apparatus forms an image printed on a paper. The image forming apparatus may be implemented as a printer, an electronic copier, a facsimile, a multifunction device having at least two functions, etc.

Recently, as an office automation device such as a multi-function device performing functions of a scanner, a facsimile, etc. together as well as a printing function printing a document, the functionality demands of image forming apparatuses has increased. Accordingly, image forming apparatuses have been developed to have high performance and to expand performable inherent functions.

Accordingly, a facsimile service using an e-mail transmission function may be supplied to the image forming apparatus. The e-mail facsimile is a function in which the image forming apparatus uses an e-mail transmission protocol to transmit an e-mail to which facsimile data is attached and sent to a facsimile server, and the facsimile server receiving the e-mail converts this to a facsimile signal and transmits the facsimile signal to a facsimile apparatus.

However, to enable the facsimile server to recognize the received e-mail as a facsimile and to normally transmit a facsimile signal, it is necessary that the image forming apparatus transmits an e-mail to include a facsimile receiver information, that is, a facsimile number in different types depending on the kind (manufacturer) of the facsimile server.

For example, if transmitting an e-mail to a facsimile server manufactured by Dell company to use a facsimile, it is necessary for the image forming apparatus to make out the subject of the e-mail in a type like 'DELL_FAX:Faxnumber_' to normally recognize a receiver side facsimile number through the e-mail received in the facsimile server and to transmit the facsimile.

Also, in a case of a facsimile server manufactured by Captaris company, it is necessary for the image forming apparatus to make out the receiver (To) of the e-mail in a type like 'FAX:Name@FaxNumber' or 'RFAX:Name@/FN=FaxNumber' to enable a normal facsimile transmission in the facsimile server.

In this manner, to allow the image forming apparatus to use the e-mail facsimile function, it is necessary to know the kind (manufacturer) of a facsimile server to which an e-mail is transmitted, in order to develop a solution to correspond to the kind of the facsimile server, and to set up an e-mail facsimile environment to correspond to the facsimile server by a program.

However, if the e-mail facsimile is set by the programming, a lot of time and cost are needed in a program setup process, and resetting the programming process by is necessary to change the kind of a facsimile server to be used, thereby causing a user inconvenience.

Also, as necessary, an e-mail facsimile type in which an e-mail server installed with an application allowing a facsimile number addition to correspond to the kind of a facsimile server receiving an e-mail is separately provided, and the e-mail server must re-transmit an e-mail transmitted in the image forming apparatus to the facsimile server. However, in case of separately providing this e-mail server, cost and time are additionally needed.

SUMMARY

Aspects and utilities of the present general inventive concept provide an image forming apparatus that displays and supplies a parameter setting screen that may be commonly applied to a plurality of facsimile servers. This will allow a user to save time and cost needed in an e-mail facsimile set up process. Aspects and utilities of the present general inventive concept also provides an e-mail server, an e-mail facsimile transmission system having the same, and an e-mail facsimile setting method of an image forming apparatus.

Additional aspects and utilities of the present general inventive concept will be set forth in part in the description which follows and, in part, will be obvious from the description, or may be learned by practice of the general inventive concept.

Embodiments of the present general inventive concept may be achieved by providing an e-mail facsimile parameter setting method of an image forming apparatus which may transmit an e-mail for a facsimile transmission to a facsimile server, the e-mail facsimile parameter setting method including displaying a parameter setting screen applied to a plurality of facsimile servers, inputting a parameter value depending on the displayed parameter setting screen, and transmitting an e-mail in an identification type to correspond to one facsimile server of the plurality of facsimile servers based on the input parameter value.

The displaying of the parameter setting screen may include displaying an e-mail field including at least one of facsimile transmitter and receiver information to be selected. The e-mail field may include at least one of an e-mail transmitter, a receiver, a subject, contents and an attached file. The attached file may include a text file.

The parameter setting screen may be supplied by at least one of a local user interface provided to the image forming apparatus, and a web user interface of a host apparatus connected with the image forming apparatus.

A receiver facsimile number may be input by using an address book.

Embodiments of the present general inventive concept may also be achieved by providing an image forming apparatus which is connected with a facsimile server, including a communicating unit which transmits an e-mail for a facsimile transmission to a facsimile server, a display unit which displays a parameter setting screen applied to a plurality of facsimile servers, a user interface which inputs a parameter value depending on the displayed parameter setting screen, and a control unit which controls the communicating unit to transmit an e-mail in a type to correspond to one facsimile server of the plurality of facsimile servers to the facsimile server based on the input setting value.

The display unit may display to allow an e-mail field including at least one of facsimile transmitter and receiver information to be selected. The e-mail field may include at least one of an e-mail transmitter, a receiver, a subject, contents and an attached file. The attached file may include a text file. A receiver facsimile number may be input by using corresponding address book.

Embodiments of the present general inventive concept may also be achieved by providing an e-mail transmission system which includes a facsimile server, an image forming apparatus transmitting an e-mail for a facsimile transmission to the facsimile server, and a host apparatus connected with the image forming apparatus, the image forming apparatus including a first communicating unit which connects to the facsimile server and the host apparatus; a web server which stores a web page including a parameter setting screen applied to a plurality of facsimile servers, and a first control unit which stores a parameter value received through the first communicating unit in the web server, and controls the first communicating unit to transmit an e-mail in an identification type to correspond to one facsimile server of the plurality of facsimile servers to the facsimile server based on the setting value, and the host apparatus including a second communicating unit which connects to the web server of the image forming apparatus, a display unit which displays a web page of the connected web server; a user interface which receives a parameter value of the displayed web page, and a second control unit which controls the display unit to display a web page applied to the plurality of facsimile servers, and controls the second communicating unit to transmit the parameter value input through the user interface to the image forming apparatus.

Embodiments of the present general inventive concept may also be achieved by providing an e-mail server which is connected with a facsimile server and an image forming apparatus, the e-mail server including a communicating unit which performs communication with a facsimile server and an image forming apparatus a display unit which displays a parameter setting screen applied to a plurality of facsimile servers, and adding at least one of facsimile transmitter and receiver in a type to correspond to one facsimile server of the plurality of facsimile servers, a user interface which inputs a parameter value depending on the displayed parameter setting screen, and a control unit which controls the communicating unit to receive an e-mail for a facsimile transmission from the image forming apparatus, and to add to the received e-mail at least one of the facsimile transmitter and receiver information in a type to correspond to one facsimile server of the plurality of facsimile servers based on the input parameter value and transmit to the facsimile server.

Embodiments of the present general inventive concept may also be achieved by providing a system for transmitting an e-mail facsimile including an image forming apparatus configured to transmit an e-mail to at least one facsimile server including facsimile transmitter or receiver information having an identification type, the image forming apparatus including a display unit to display a parameter setting screen to be applied to at least one facsimile server; and, and at least one facsimile server to recognize the transmitter or receiver information upon receiving the e-mail.

Embodiments of the present general inventive concept may also be achieved by providing an e-mail facsimile transmitting method of an image forming apparatus including displaying a parameter setting screen applied to a plurality of facsimile servers, inputting a first parameter value depending on the displayed parameter setting screen, transmitting a first e-mail of a first type to correspond to one facsimile server of the plurality of facsimile servers based on the first input parameter value, resetting the parameter setting screen and inputting a second parameter value, and transmitting a second e-mail of a second type to correspond to another facsimile server of the plurality of facsimile servers based on the second input parameter value.

The parameter setting screen may include a prefix item field and a suffix item field. The first or second parameter value may include transmitter or receiver information.

BRIEF DESCRIPTION OF THE DRAWINGS

The present general inventive concept will become apparent and more readily appreciated from the following description of the exemplary embodiments, taken in conjunction with the accompanying drawings, in which FIG. 1 schematically illustrates a configuration of an e-mail facsimile transmission system according to an exemplary embodiment of the present general inventive concept.

DETAILED DESCRIPTION OF THE EMBODIMENTS

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures. Repetitive description with respect to like elements of different embodiments may be omitted for the convenience of clarity.

Figure 1:
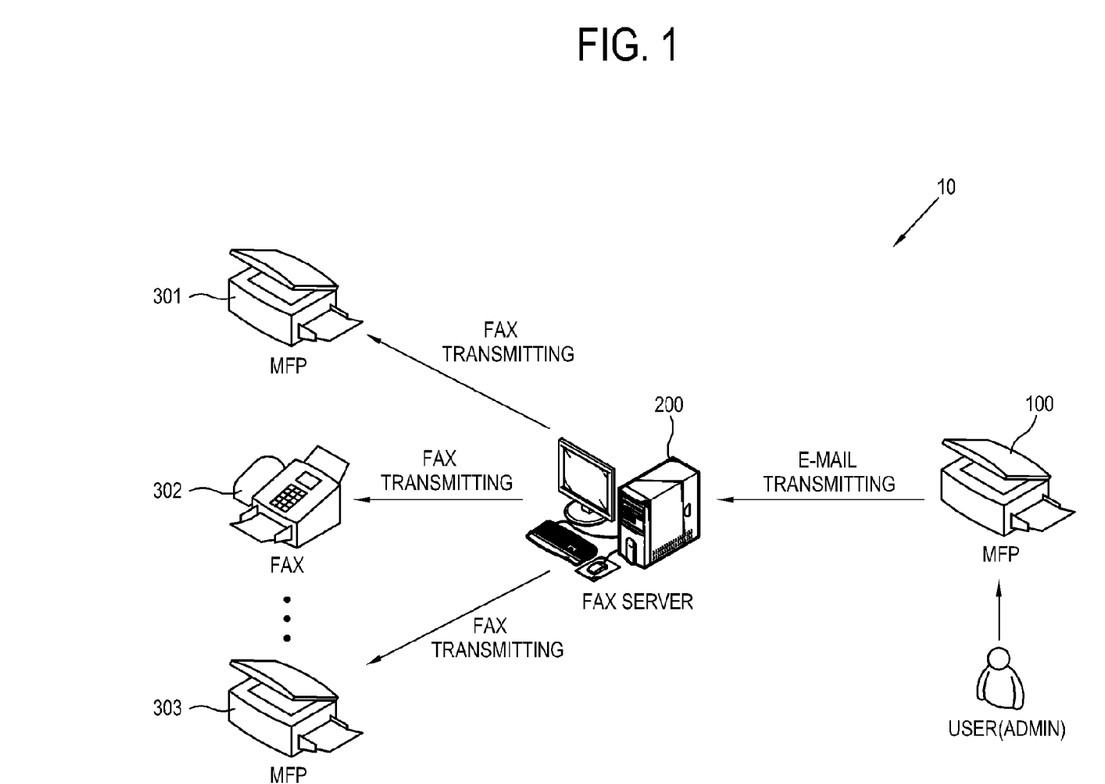

FIG. 1 schematically illustrates a configuration of an e-mail facsimile transmission system 10 according to an exemplary embodiment of the present general inventive concept.

As illustrated in FIG. 1, the e-mail facsimile transmission system 10 includes an image forming apparatus 100, at least one facsimile server 200 and at least one receiving facsimile apparatus 301, 302, . . . and 303.

The image forming apparatus 100 may transmit an e-mail of a predetermined identification type with an attachment of or attached with facsimile data depending on an e-mail protocol to a facsimile server 200. The facsimile server 200 may include a transmitter and a receiver to receive information transmitted from the image forming apparatus 100 including the identification type of the received e-mail. The facsimile server 200 may receive the e-mail and may decode or decipher instruction commands included in the transmission and may separate an e-mail message from the attached facsimile data. The facsimile server 200 may then transmit a facsimile to the receiving facsimile apparatuses 301, 302, . . . and 303 depending on the identification type of the received e-mail.

The image forming apparatus 100 may be implemented as a printer, a copier, a scanner, or a multifunction device, etc. connected to a network and having an e-mail transmission function. The receiving facsimile apparatuses 301, 302, . . . and 303 may be implemented as image forming apparatuses such as a facsimile, a multifunction device, etc. having facsimile receiving functions.

Figure 2:
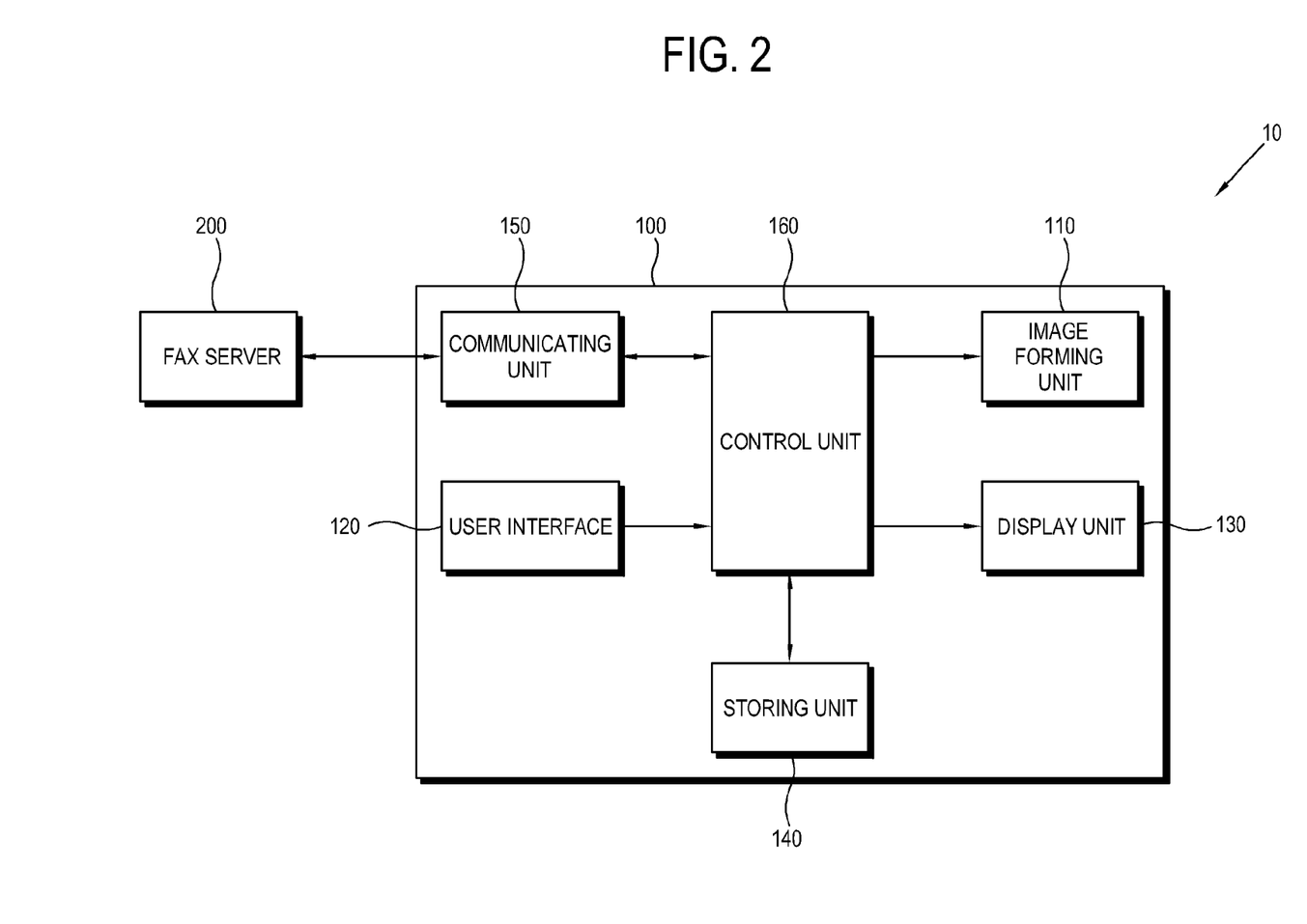
FIG. 2 is a block diagram illustrating a configuration of the image forming apparatus according to an exemplary embodiment of the present general inventive concept.

FIG. 2 is a block diagram illustrating a configuration of the image forming apparatus 100 according to the exemplary embodiment of the present general inventive concept.

As illustrated in FIG. 2, the image forming apparatus 100 includes an image forming unit 110, a user interface 120, a display unit 130, a storing unit 140, a communicating unit 150 and a control unit 160. FIG. 2 also illustrates a facsimile server 200 in two-way communication with the communication unit 150 of the image forming apparatus 100.

The image forming unit 110 may form an image printed on paper or other printing medium such as a transparency based on printing data if a printing command is applied. Images formed by the image forming unit 110 may also be stored in the storage unit 140.

A user may use the user interface 120 of the image forming apparatus 100 to set parameter values using a parameter setting screen displayed in the display unit 130. In detail, the user interface 120 may receive a parameter value so that information required for the facsimile transmitter and facsimile receiver can be set depending on an e-mail identification type. In addition to having a plurality of facsimile receiver apparatuses 301, 302, 303, etc., the facsimile transmission system 10 may include a plurality of facsimile servers 200. The facsimile server 200 that receives an e-mail with certain parameter values may be one of the plurality of facsimile servers to which the e-mail is intended to be transmitted. A user may use the user interface 120 to send an e-mail to a desired facsimile server 200 among the plurality of facsimile servers using a parameter setting screen for a facsimile server 200 displayed in the display unit 130. The display unit 130 may include a thin film transistor-liquid crystal display (TFT-LCD) and a driving unit (not illustrated) driving the TFT-LCD.

The user interface 120 may include a panel (key buttons) representing functions of the image forming apparatus 100, or a graphic user interface (GUI) (hereinafter, will be also referred to 'local user interface (LUI)'). The user interface 120 may be generated by execution of a driver or a separate application to be displayed in the display unit 130 so that a user can input desired parameter settings. If the user interface 120 includes the GUI, the image forming apparatus 100 displays the GUI including the parameter setting screen of the facsimile server 200, and receives the setting value input by a user by using the displayed GUI.

Alternatively, the user interface 120 may be implemented as a web user interface (WUI) (hereinafter, this will be also be referred to as a 'remote user interface (RUI)') displayed in a personal computer that is capable of being connected to the image forming apparatus 100 in an external part as necessary. If the user interface 120 is implemented as a WUI, the image forming apparatus 100 may include a web server 170 illustrated in FIG. 4 capable of being connected to a network, and the WUI may be a web page based on a hypertext transfer protocol (HTTP).

The display unit 130 displays a parameter setting screen which may be commonly applied to the plurality of facsimile servers. In detail, the display unit 130 may display to a user an e-mail facsimile parameter setting screen to enable the facsimile server 200 to normally recognize facsimile transmitter and receiver information that depends on an identification type of an e-mail that corresponds to the kind (manufacturer) of the facsimile server 200.

The user may determine an input identification type of at least one of the facsimile transmitter and receiver information to correspond to at least one facsimile server 200 of the plurality of facsimile servers. The input identification types correspond to the e-mail facsimile parameter setting screen displayed in the display unit 130. The image forming apparatus 100 may transmit an e-mail in which at least one of facsimile transmitter and receiver information is included and is sent to the facsimile server 200 depending on the determined input identification type of the e-mail.

FIGS. 3A to 3D illustrate an example of a parameter setting screen for a facsimile server 200 of an e-mail facsimile according to the exemplary embodiment of the present general inventive concept.

The display unit 130 may display an e-mail parameter setting screen to transmit an e-mail in the image forming apparatus 100.

Figure 3A:
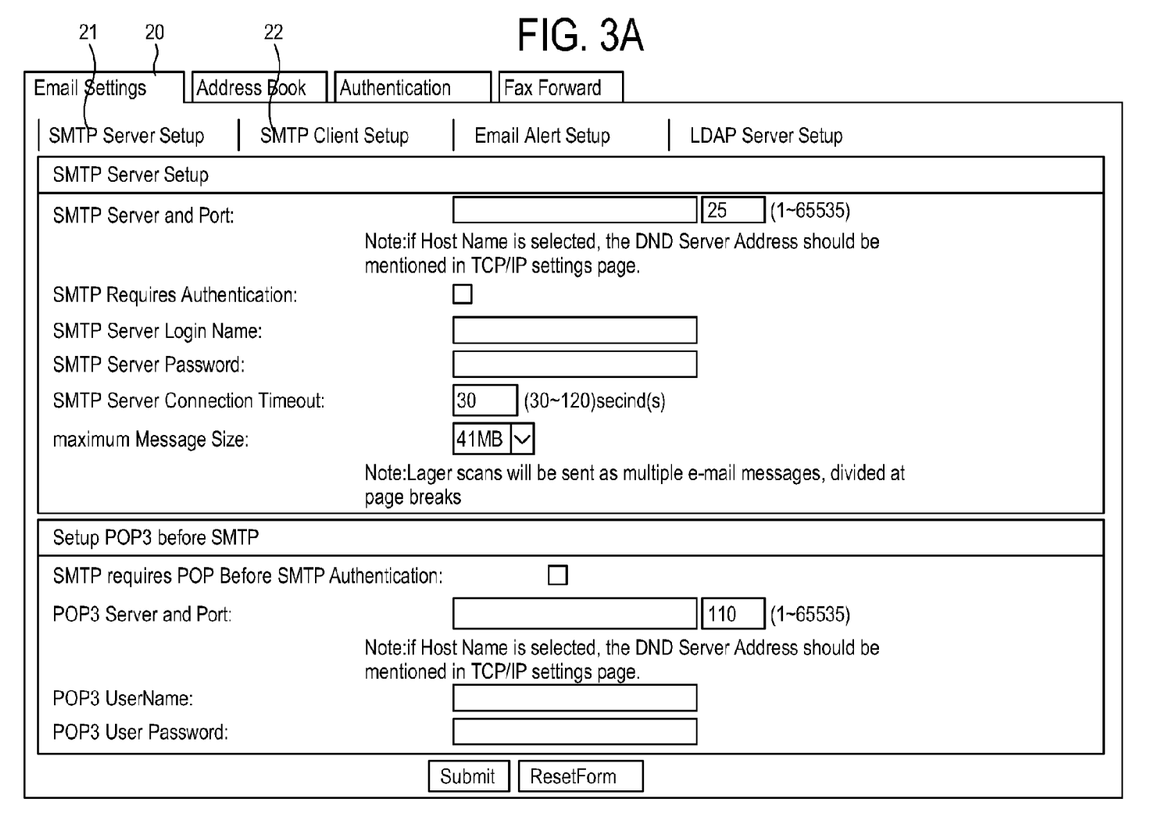
FIGS. 3A to 3D illustrate an example of a parameter setting screen of an e-mail facsimile according to an exemplary embodiment of the present general inventive concept.

A user may select an e-mail setting tab 20 and a simple mail transfer protocol (SMTP) server setup sub-tab 21 in sequence through the user interface 120 in a screen displayed as illustrated in FIG. 3A, and the user may set parameters for the facsimile server 200 to which the e-mail may be transmitted by an SMTP.

Figure 3B:
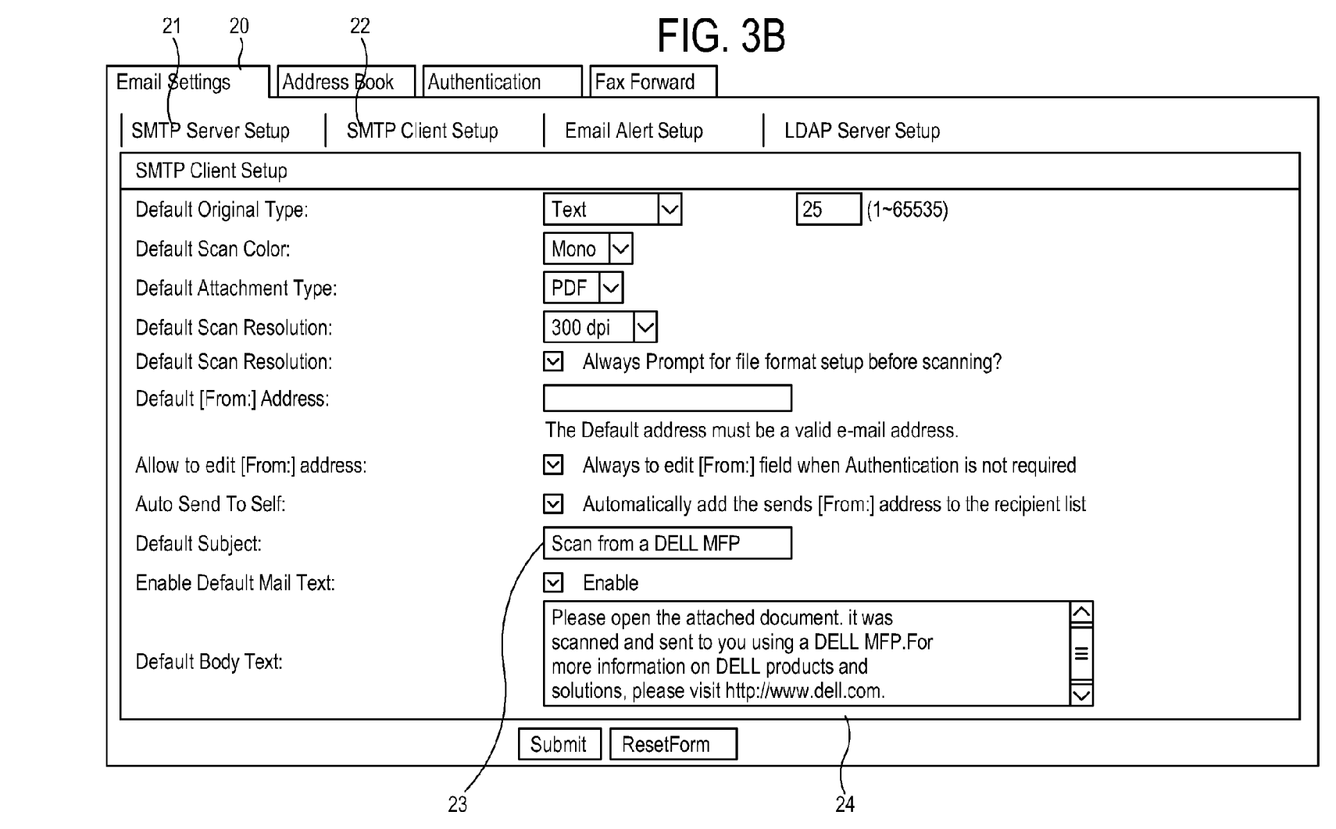

Also, the user may select a SMTP client setup sub-tab 22 as illustrated in FIG. 3B so that the e-mail can be transmitted to the corresponding facsimile server 200 by an e-mail transmission protocol such as the SMTP. Here, the user may input a text capable of being inserted to a subject field 23 or a body field 24 as a default with respect to the e-mail transmitted from the image forming apparatus 100.

Figure 3C:
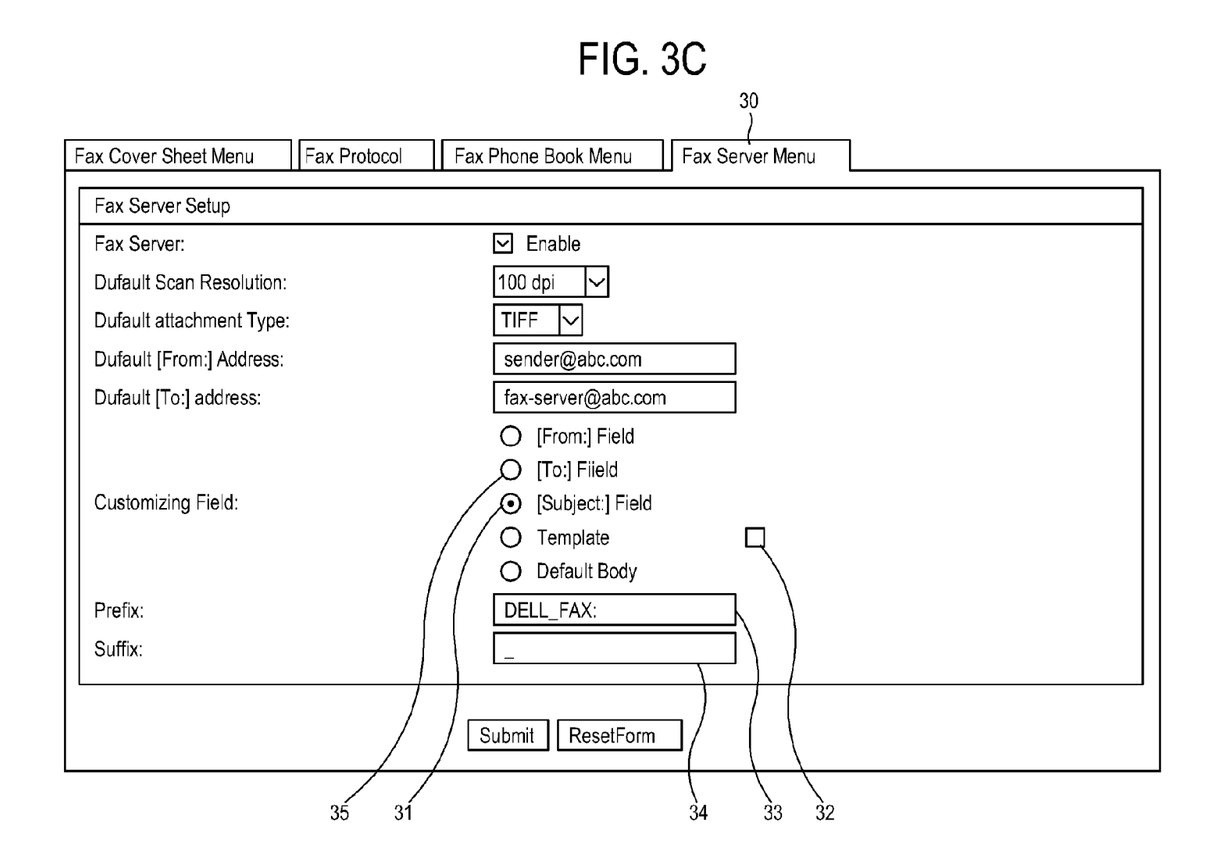

If setting the e-mail parameters as illustrated in FIGS. 3A and 3B is completed, the display unit 130 may display a facsimile server parameter setting screen as illustrated in FIG. 3C.

The user may select a facsimile server menu tab 30 in the displayed screen as illustrated in FIG. 3C, and may input a parameter with respect to the desired facsimile server through the user interface 120.

In detail, the parameter setting screen to select the kind of the facsimile server becomes a parameter setting screen of an e-mail identification type. This may enable the facsimile server 200 to recognize facsimile transmitter and receiver information depending on an input identification type of the facsimile transmitter and receiver information that corresponds to the facsimile server 200 as illustrated in FIG. 3C.

Accordingly, the user may select an e-mail field to which at least one of the facsimile transmitter and receiver information is included in the displayed parameter setting screen. For example, in case of the facsimile server 200 manufactured by Dell company as illustrated in FIG. 3C, the user may select the subject field 31 through the user interface 120 as the e-mail field to which the facsimile receiver information is included. Here, the facsimile receiver information may be a facsimile number of a receiving facsimile apparatus 301, 302, 303, etc.

Here, the selectable e-mail field in which the receiver information such as the receiver facsimile number or the transmitter information is included may include at least one of an e-mail transmitter (From), a receiver (To), a subject (Subject), contents (Body) and an attached file (Template). If selecting the attached file (Template), the user may make a selection in a check box 32 so that the transmitter information or the receiver information can be transmitted as an attached file, and the attached file may include a text file.

If the receiver facsimile number is included in the subject field 31 as illustrated in FIG. 3C, the parameter setting screen may include at least one of a prefix item (Prefix) 33 and a suffix item (Suffix) 34 of the receiver facsimile number.

Accordingly, the user may input data to correspond to the prefix and suffix in each item 33 and 34 depending on the input identification type of the receiver facsimile number to correspond to the kind of the facsimile server 200. That is, for example, in case of the facsimile server 200 using the type of 'DELL_FAX:Faxnumber_' in the subject field 31 manufactured by Dell company, the user inputs 'DELL_FAX:' in the prefix item 33, and inputs "_" in the suffix item 34.

In an exemplary embodiment in FIG. 3C, the facsimile server 200 of Dell company is exemplarily described, but the parameter setting screen according to the present general inventive concept may be applied to a case of transmitting an e-mail to a facsimile server of other kinds (manufacturers) of facsimile servers 200.

For example, in case of using the facsimile server 200 of Captaris company using the identification type of 'FAX:Name@FaxNumber' in the receiver (To) field, the user may select the e-mail receiver (To) field 35 as the e-mail field to which the facsimile receiver information is included. Here, if the e-mail receiver field 35 is selected, the prefix item field 33 and the suffix item field 34 in FIG. 3C may include items of a user name, a host information, a domain name, etc. depending on the e-mail receiver input identification type.

Accordingly, the user may set the e-mail facsimile so that the receiver facsimile number can be input in the domain item, and setting and changing of the receiver facsimile number is capable depending on the kind of the facsimile server with respect to the manufacturer.

The setting screen in FIG. 3C may be applied to transmitter information, facsimile server information, etc. as well as a receiver facsimile number. In detail, in the case of the facsimile server of Dell company, the user may select the e-mail transmitter field to input a transmitter's address (or Sender's address) in the prefix item field 33 and to input dell.fr in the suffix item 34 so that the transmitter information can be recognized. Or, the user may select the e-mail receiver field to input the fax-server in the prefix item field 33 and to input dell.fr in the suffix item field 34 so that the facsimile server information can be recognized.

As described above, the image forming apparatus 100 according to the present exemplary embodiment uses the user interface 120 having a parameter setting screen capable of being commonly applied to a plurality of facsimile servers irrespective of the kind (manufacturer) of the facsimile server 200, thereby conveniently setting and changing the e-mail facsimiles that may be transmitted to the plurality of facsimile servers.

Therefore, in operation, a first parameter value may be input to a field of the parameter setting screen and a first e-mail of a first identification type to correspond to one facsimile server of the plurality of facsimile servers may be transmitted based on the first input parameter value. Then, the parameter setting screen may be reset and a second parameter value may be input to a field of the parameter setting screen, and a second e-mail of a second type that corresponds to a second kind of facsimile server may be transmitted based on the second input parameter value. This process may be repeated multiple times to send e-mails to a plurality of facsimile servers.

Figure 3D:
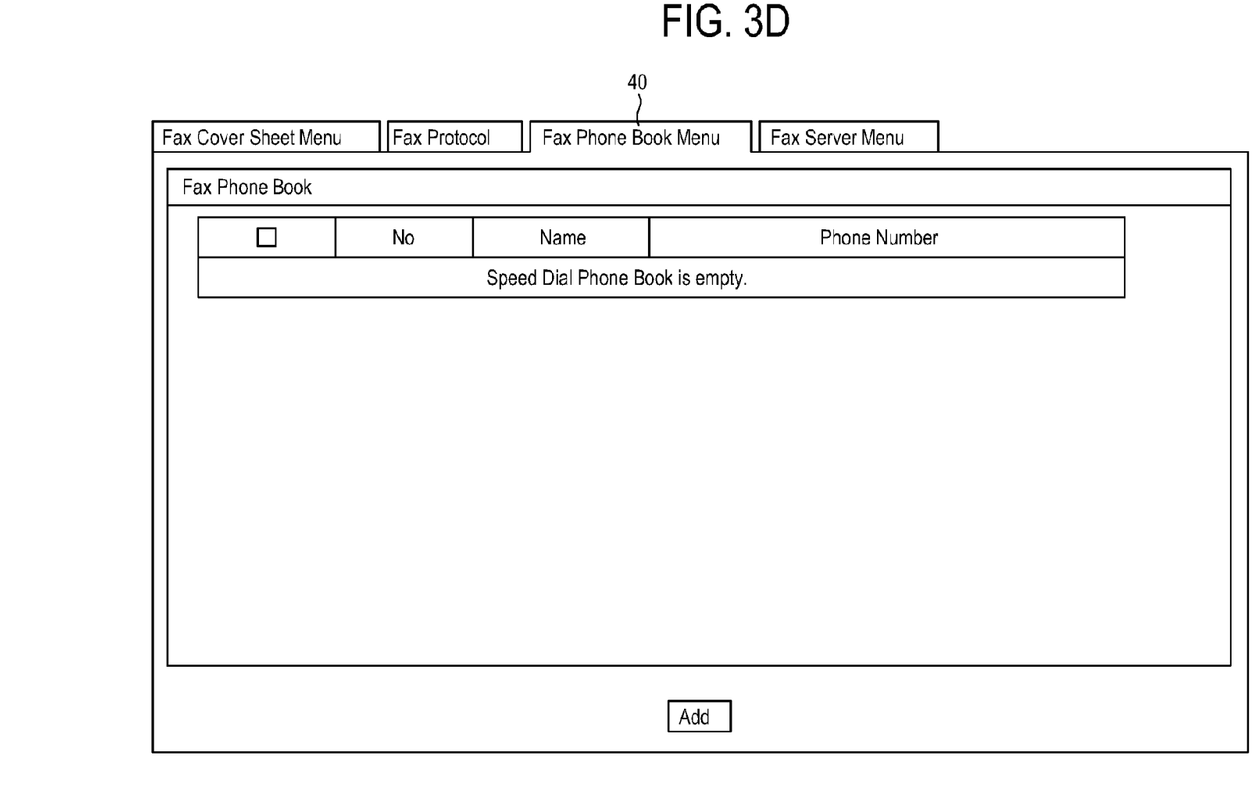

If a setup of the e-mail facsimile parameter settings as illustrated in FIG. 3C is completed, the display unit 130 may display an address book input screen as illustrated in FIG. 3D.

In the address book input screen, the user may select a facsimile address book menu tab 40 in the displayed screen as illustrated in FIG. 3D, and may input a facsimile address book through the user interface 120.

The input process of entering data into the address book in FIG. 3D may be implemented in a variety of ways such as by direct entry through the user interface 120, transferred from another computer over the intranet or internet, through an external memory device, or by other methods or apparatuses.

The information input illustrated in FIGS. 3A to 3D may be stored in the storing unit 140. The storing unit 140 may be implemented as internal or external storage modules such as a hard disk drive (HDD), a flash memory, etc. Facsimile data attached in the e-mail facsimile may be further stored in the storing unit 140 of the image forming apparatus 100 according to an exemplary embodiment of the present general inventive concept.

The communicating unit 150 illustrated in FIG. 2 may transmit an e-mail to which predetermined facsimile data may be attached and sent to the facsimile server 200 depending on the set e-mail facsimile environment. The image forming apparatus 100 according to the present exemplary embodiment may transmit the e-mail to the facsimile server 200 by using the SMTP protocol.

For example, if the e-mail facsimile parameters as illustrated in FIGS. 3A to 3D are completed and stored, the user may transmit an e-mail to the facsimile server 200 by using the stored e-mail facsimile parameters. In detail, the user may select a Fax to Server menu option through the user interface 120 provided on the image forming apparatus 100, and may select facsimile data to be transmitted. Then, the user may input a facsimile number in a receiver side facsimile number input field by using a key button on the user interface 120. Or, the user may select a receiver side facsimile number through the stored address book as illustrated in FIG. 3D, and then transmit the e-mail to which the facsimile data is attached to the facsimile server 200 through the use of a facsimile transmitting button by using the set e-mail facsimile environment. The attached facsimile data may be image data.

Accordingly, irrespective of the kind of the facsimile server, if the e-mail facsimile environment is set by using the user interface 120, the image forming apparatus 100 according to the present exemplary embodiment can conveniently transmit the e-mail attached with the facsimile data to the facsimile server 200 by inputting the receiver side facsimile number. Here, the receiver side facsimile number may be input by using the input address book as illustrated in FIG. 3D.

The communicating unit 140 may be implemented as wired or wireless communication modules capable of being connected with an external device such as the facsimile server 200 by a local connection or a network connection by a predetermined protocol.

The control unit 160 controls the image forming apparatus 100. In detail, the control unit 160 controls the display unit 130 to display the parameter setting screen commonly applied to a plurality of facsimile servers. A parameter value may be received by using the user interface 120, depending on the displayed parameter setting screen. The control unit 160 may transmit an e-mail to a facsimile server 200 to correspond to a facsimile server 200 of the plurality of facsimile servers based on an input parameter value.

Figure 4:
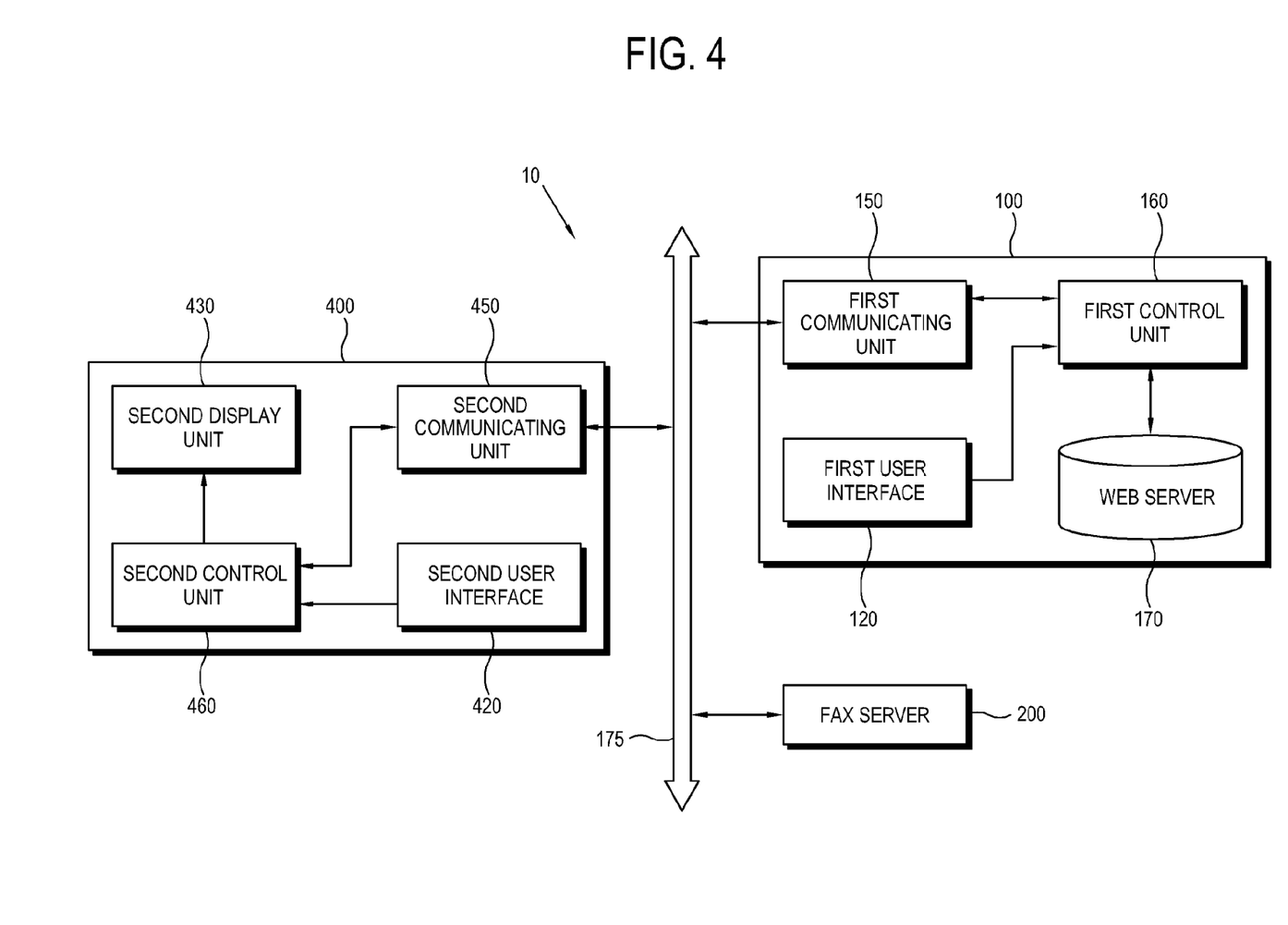
FIG. 4 illustrates an e-mail facsimile transmission system setting a facsimile environment by using a web user interface (WUI) according to an exemplary embodiment of the present general inventive concept.

FIG. 4 illustrates an e-mail facsimile transmission system setting a facsimile environment by using a web user interface (WUI) according to an exemplary embodiment of the present general inventive concept.

As illustrated in FIG. 4, the e-mail facsimile transmission system 10 includes an image forming apparatus 100 including a web server 170, a communication link 175 which may include wired or wireless connections to transmit an e-mail for a facsimile transmission to a facsimile server. The e-mail facsimile transmission system 10 also includes a facsimile server 200 receiving the e-mail from the image forming apparatus 100 and transmitting a facsimile to receiver side facsimile apparatuses 301, 302, ... 303, illustrated in FIG. 1. The e-mail facsimile transmission system 10 may also include a host apparatus 400 to connect to the web server 170 and to set up an e-mail facsimile environment. The host apparatus 400 may be implemented as a personal computer, laptop computer, or other apparatus.

The image forming apparatus 100 of the e-mail facsimile transmission system 10 illustrated in FIG. 4 includes the configurations of the image forming apparatus 100 illustrated in FIG. 2. The image forming apparatus 100 may further include a web server 170 in which a web page allowing an e-mail facsimile set up by a web user interface (WUI) to be stored.

In the exemplary embodiments according to the present general inventive concept illustrated in FIGS. 2 and 4, the same reference numerals are referred to elements performing the same functions, and description of elements may be commonly applied to the exemplary embodiments in FIGS. 2 and 4.

In detail, if the host apparatus 400 connects to the web server 170 through a second communicating unit 450, a second display unit 430 may display a web page to correspond to the web server 170 under a control of a second control unit 460. The displayed web page may display the same images as the parameter setting screen illustrated in FIGS. 3A to 3D.

The user may input a parameter value of the displayed web page by using a second user interface 420 of the host apparatus 400. The second user interface 420 may include a mouse, a keyboard, touch screen, or other input interfaces.

The second control unit 460 may control the second communicating unit 450 to transmit parameter values input through the second user interface 420 to the image forming apparatus 100.

The image forming apparatus 100 receives parameter values transmitted from the host apparatus 400 through a first communicating unit 150, and stores the received parameter values in the web server 170 under a control of a first control unit 160.

Also, if facsimile transmission is selected through a first user interface 120, the image forming apparatus 100 may transmit an e-mail attached with a facsimile data to the facsimile server 200 in an e-mail type to correspond to the parameter value stored in the web server 170.

Figure 5:
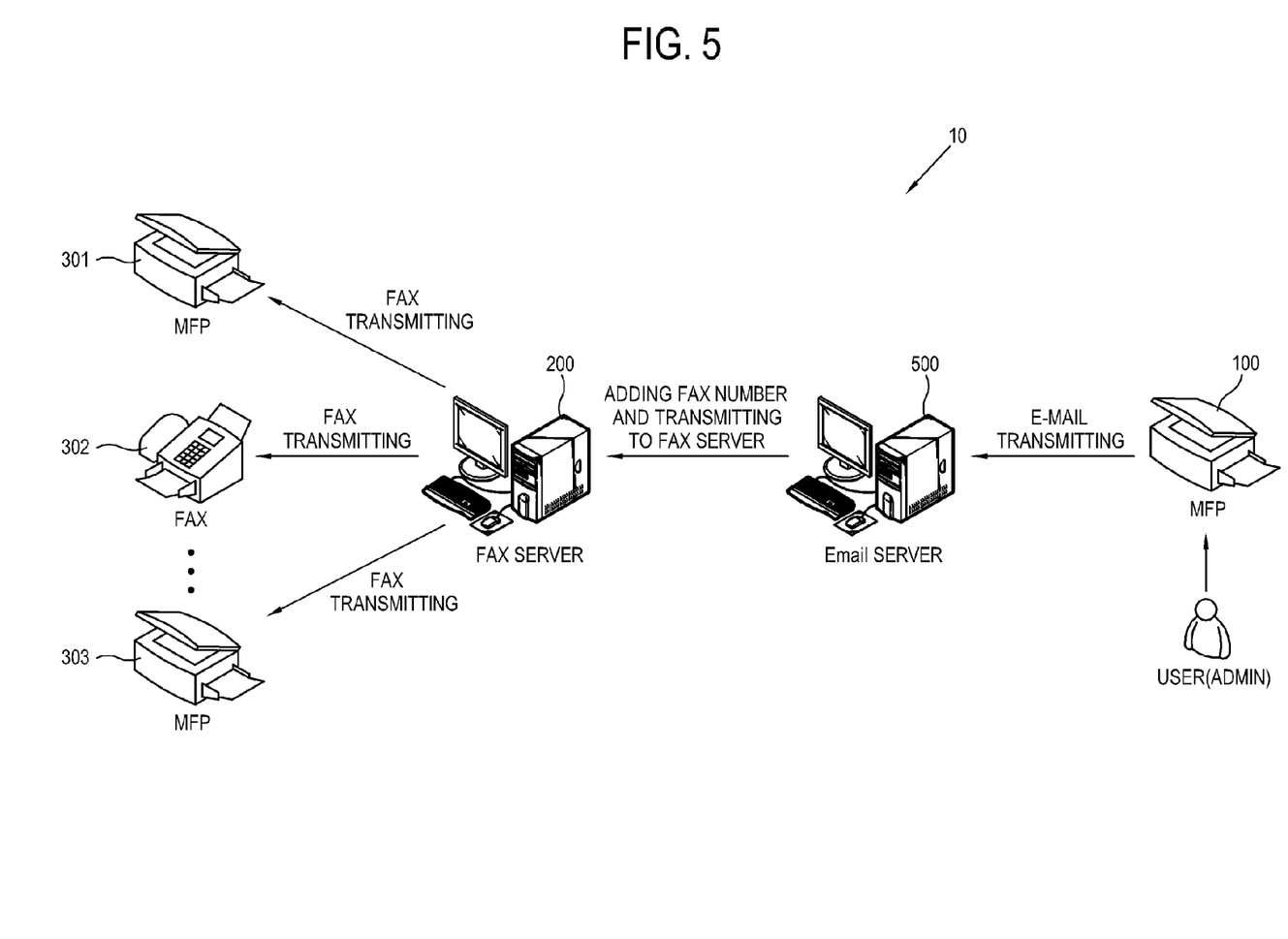
FIG. 5 schematically illustrates a configuration of an e-mail facsimile transmission system according to another exemplary embodiment of the present general inventive concept.

According to another exemplary embodiment of the present general inventive concept as illustrated in FIG. 5, an e-mail facsimile transmission system 10 may include an e-mail server 500 receiving an e-mail attached with facsimile data from an image forming apparatus 100. The e-mail facsimile transmission system 10 may add a facsimile number with an identification type to correspond to the kind of a facsimile server 200 to transmit to the facsimile server 200.

The e-mail server 500 may communicate with the facsimile server 200 and the image forming apparatus 100 through a communicating unit (not illustrated), and may display a parameter setting screen commonly applied to a plurality of facsimile servers and add a receiver facsimile number through a display unit. The e-mail server 500 may select an identification input type of the receiver facsimile number depending on the displayed parameter setting screen by using a user interface. Here, the added information may include a transmitter information, a facsimile server information, etc. as well as the receiver facsimile number.

The parameter setting screen displayed in the e-mail server 500 may be similar to the screen and tabs displayed in FIGS. 3A to 3D.

Accordingly, the e-mail server 500 may receive an e-mail for a facsimile transmission from the image forming apparatus 100, and may add a facsimile number of an identification type to correspond to the kind of facsimile server 200 of a plurality of facsimile servers. The e-mail server 500 may receive the received e-mail which may be transmitted to the facsimile server 200.

The e-mail server 500 according to the present exemplary embodiment may be implemented as a personal desktop computer, local area network (LAN), etc.

Hereinafter, an e-mail facsimile parameter setting process in the image forming apparatus 100 as described above will be described by referring to FIG. 6.

Figure 6:
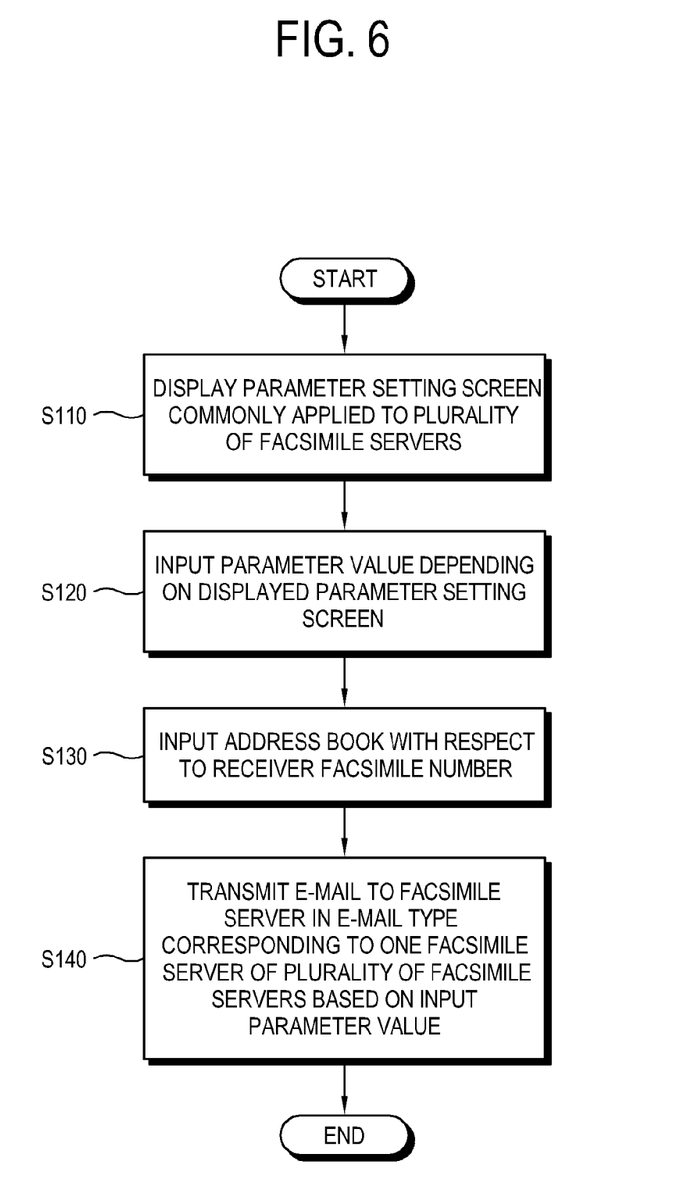
FIG. 6 is a flowchart illustrating an e-mail facsimile setting method according to an exemplary embodiment of the present general inventive concept.

Referring to FIGS. 2 and 6, the image forming apparatus 100 may display a setup screen to set parameters commonly applied to a plurality of facsimile servers in the display unit 120 (operation S110). Here, the screen may be a parameter setting screen to recognize at least one of facsimile transmitter and receiver information depending on an e-mail type to correspond to one facsimile server 200 of the plurality of facsimile servers.

The parameter setting screen may be displayed in a manner such that an e-mail field in which at least one of facsimile transmitter and receiver information is included can be selected, and the facsimile receiver information includes a receiver side facsimile number. Also, the e-mail field may include at least one of an e-mail transmitter, a receiver, a subject, contents and an attached file.

A user may input a parameter value depending on the parameter setting screen displayed in the operation S110 through the user interface 120 (operation S120). The user may select an e-mail field in which at least one piece of information of facsimile transmitter and receiver may depend on an input identification type of the facsimile transmitter and receiver that correspond to one kind of facsimile server 200 of the plurality of facsimile servers. The user may input at least one of parameter settings of a prefix, a suffix, a user name, a domain name, a host information, etc. into the e-mail field in order to send a facsimile to a respective facsimile server 200.

The user may input an address book with respect to the receiver facsimile number (operation S130).

The image forming apparatus 100 may transmit an e-mail to the facsimile server 200 in the e-mail type to correspond to one facsimile server 200 of the plurality of facsimile servers based on the parameter value input in the operation S120 (operation S140).

According to another exemplary embodiment of the present general inventive concept, the operations S110 to S140 may be performed through a WUI using the host apparatus 100 capable of being connected to the web server 170 of the image forming apparatus 100 as well as an LUI provided to the image forming apparatus 100, and may use a separate UI of the e-mail server 500 as necessary.

Also, according to the present exemplary embodiment, a UI capable of being commonly applied in setup of an e-mail facsimile can be applied irrespective of the kind (manufacturer) of the facsimile server 200, thereby supplying convenience in the e-mail facsimile parameter setting process to a user.

As described above, an image forming apparatus, an e-mail server, an e-mail facsimile transmission system having the same, and an e-mail facsimile setting method of an image forming apparatus according to the present general inventive concept may display a parameter setting screen commonly applied to a plurality of facsimile servers, thereby saving time and cost needed in e-mail facsimile configurations.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An e-mail facsimile parameter setting method of an image forming apparatus which transmits an e-mail for a facsimile transmission to a facsimile server, the e-mail facsimile parameter setting method comprising:
displaying a parameter setting screen applicable to a plurality of kinds of facsimile servers, including displaying a plurality of e-mail fields which are selectable by a user;
inputting a parameter value using the displayed parameter setting screen by selecting one of the plurality of e-mail fields and inputting a facsimile number of a facsimile receiver on the selected e-mail field, wherein the parameter value corresponds to one kind of facsimile server; and
transmitting the e-mail of a type to correspond to the one kind of facsimile server of the plurality of facsimile servers based on the input parameter value, the selected e-mail field including at least one of a prefix and a suffix that is added according to the inputted facsimile number of the facsimile receiver,
wherein the facsimile server receives the e-mail from the image forming apparatus, converts the received e-mail to a facsimile signal, and transmits the facsimile signal to a facsimile apparatus corresponding to the inputted facsimile number.

2. The e-mail facsimile setting method according to claim 1, wherein one of the plurality of e-mail fields is selected to include facsimile transmitter information.

3. The e-mail facsimile setting method according to wherein the facsimile server receives the e-mail from the image forming apparatus, converts the received e-mail to a facsimile signal, and transmits the facsimile signal to a facsimile apparatus corresponding to the inputted facsimile number. claim 2, wherein the plurality of e-mail fields comprises an e-mail transmitter, a receiver, a subject, contents and an attached file.

4. The e-mail facsimile setting method according to claim 3, wherein the attached file comprises a text file.

5. The e-mail facsimile setting method according to claim 1, wherein the parameter setting screen is supplied by at least one of a local user interface provided to the image forming apparatus, and a web user interface of a host apparatus connected with the image forming apparatus.

6. The e-mail facsimile setting method according to claim 1, wherein the facsimile number for the facsimile transmission is input by using an address book.

7. An image forming apparatus which is connected with a facsimile server, comprising:
a communicating unit which transmits an e-mail for a facsimile transmission to the facsimile server;
a display unit which displays a parameter setting screen applicable to a plurality of facsimile servers, and which displays a plurality of e-mail fields which are selectable by a user;
a user interface which inputs a parameter value using the displayed parameter setting screen, wherein the parameter value corresponds to one kind of facsimile server, and the user interface receives the user's input to select one of the plurality of e-mail fields and to select a facsimile number of a facsimile receiver on the selected e-mail; and
a control unit which controls the communicating unit to transmit an e-mail in a type to correspond to the one kind of facsimile server of the plurality of facsimile servers to the facsimile server based on the input setting value, the selected e-mail field including at least one of a prefix and a suffix that is added according to the selected facsimile number of the facsimile receiver,
wherein the facsimile server receives the e-mail from the image forming apparatus, converts the received e-mail to a facsimile signal, and transmits the facsimile signal to a facsimile apparatus corresponding to the inputted facsimile number.

8. The image forming apparatus according to claim 7, wherein on of the plurality of e-mail fields is selected to comprise facsimile transmitter information.

9. The image forming apparatus according to claim 8, wherein the plurality e-mail fields comprise an e-mail transmitter, a receiver, a subject, contents and an attached file.

10. The image forming apparatus according to claim 9, wherein the attached file comprises a text file.

11. The image forming apparatus according to claim 7, wherein the facsimile number for the facsimile transmission is input by using corresponding address book.

12. An e-mail transmission system which comprises a facsimile server, an image forming apparatus transmitting an e-mail for a facsimile transmission to the facsimile server, and a host apparatus connected with the image forming apparatus, the image forming apparatus comprising:
a first communicating unit which connects to the facsimile server and the host apparatus;
a web server which stores a web page comprising a parameter setting screen applicable to a plurality of kinds of facsimile servers; and
a first control unit which stores a parameter value received through the first communicating unit in the web server, and controls the first communicating unit to transmit the e-mail of an identification type corresponding to one kind of facsimile server of the plurality of kinds of facsimile servers to the facsimile server based on the parameter value, wherein the parameter value corresponds to one kind of facsimile server, and
the host apparatus comprising:
a second communicating unit which connects to the web server of the image forming apparatus;
a display unit which displays the web page of the connected web server, and which displays the plurality of e-mail fields which are selectable by the user in the web page;
a user interface which receives the parameter value of the displayed web page, and which receives the user's input to select one of the plurality of the e-mail fields and to select a facsimile number of a facsimile receiver on the selected e-mail field, the selected e-mail field including at least one of a prefix and a suffix that is added according to the selected facsimile number of the facsimile receiver; and a second control unit which controls the display unit to display the web page applicable to the plurality of kinds of facsimile servers, and controls the second communicating unit to transmit the parameter value input through the user interface to the image forming apparatus, wherein the facsimile server receives the e-mail from the image forming apparatus, converts the received e-mail to a facsimile signal, and transmits the facsimile signal to a facsimile apparatus corresponding to the inputted facsimile number.

13. An e-mail server which is connected with a facsimile server and an image forming apparatus, the e-mail server comprising:

a communicating unit which performs communication with a facsimile server and an image forming apparatus;

a display unit which displays a parameter setting screen applicable to a plurality of kinds of facsimile servers, and adding at least one of facsimile transmitter and receiver of a type to correspond to one kind of facsimile server of the plurality of kinds of facsimile servers, the display unit to display a plurality of e-mail fields which are selectable by a user;

a user interface which inputs a parameter value depending on the displayed parameter setting screen, wherein the parameter value corresponds to the one kind of facsimile server, and the user interface receives the user's input to select one of the plurality of e-mail fields and to select a facsimile number of the facsimile receiver on the selected e-mail field, the selected e-mail field including at least one of a prefix and a suffix that is added according to the selected facsimile number of the facsimile receiver; and a control unit which controls the communicating unit to receive an e-mail for a facsimile transmission from the image forming apparatus, and to add to the received e-mail at least one of the facsimile transmitter and receiver information of a type to correspond to the one kind of facsimile server of the plurality of kinds of facsimile servers based on the input parameter value and transmitted to the facsimile server, wherein the facsimile server receives the e-mail including the facsimile number which is added by the e-mail server, converts the received e-mail to a facsimile signal, and transmits the facsimile signal to a facsimile apparatus corresponding to the facsimile number.

14. An e-mail facsimile transmitting method of an image forming apparatus comprising:

displaying a parameter setting screen applicable to a plurality of kinds of facsimile servers, the displaying the parameter setting screen including displaying a plurality of e-mail fields which are selectable by a user;

inputting a first parameter value using the displayed parameter setting screen, wherein the parameter value corresponds to a first kind of facsimile server, the inputting the first parameter value including selecting one of the plurality of e-mail fields corresponding to the first kind of facsimile server and inputting a facsimile number of a first facsimile receiver on the selected e-mail field, the selected e-mail field including at least one of a prefix and a suffix that is added according to the inputted facsimile number of the first facsimile receiver;

transmitting a first e-mail of a first type to correspond to one kind of facsimile server of the plurality of kinds of facsimile servers based on the first input parameter value;

resetting the parameter setting screen and inputting a second parameter value, wherein the second parameter value corresponds to a second kind of facsimile server, and the inputting of the second parameter value includes selecting one of the plurality of e-mail fields corresponding to the second kind of facsimile server and inputting a facsimile number of a second facsimile receiver on the selected e-mail field, the selected e-mail field including at least one of a prefix and a suffix that is added according to the inputted facsimile number of the second facsimile receiver; and transmitting a second e-mail of a second type to correspond to another kind of facsimile server of the plurality of kinds of facsimile servers based on the second input parameter value, wherein the facsimile server receives the first and second e-mail from the image forming apparatus, converts the received first and second e-mail to first and second facsimile signals, and transmits the first and second facsimile signals to a facsimile apparatus corresponding to the inputted first and second facsimile number, respectively.

15. The e-mail facsimile transmitting method according to claim 14, wherein the first or second parameter value includes receiver information.

* * * * *